US010726325B2

United States Patent
Krishnamurthy et al.

(10) Patent No.: US 10,726,325 B2
(45) Date of Patent: Jul. 28, 2020

(54) FACILITATING MACHINE-LEARNING AND DATA ANALYSIS BY COMPUTING USER-SESSION REPRESENTATION VECTORS

(71) Applicant: Adobe Inc., San Jose, CA (US)

(72) Inventors: Balaji Krishnamurthy, Noida (IN); Piyush Gupta, Noida (IN); Nupur Kumari, Bihar (IN); Akash Rupela, Delhi (IN)

(73) Assignee: Adobe Inc., San Jose, CA (US)

( * ) Notice: Subject to any disclaimer, the term of this patent is extended or adjusted under 35 U.S.C. 154(b) by 680 days.

(21) Appl. No.: 15/486,862

(22) Filed: Apr. 13, 2017

(65) Prior Publication Data
US 2018/0300609 A1    Oct. 18, 2018

(51) Int. Cl.
*G06N 3/04* (2006.01)
*G06N 3/08* (2006.01)

(52) U.S. Cl.
CPC ......... *G06N 3/0445* (2013.01); *G06N 3/0454* (2013.01); *G06N 3/088* (2013.01)

(58) Field of Classification Search
CPC ..... G06N 3/0445; G06N 3/0454; G06N 3/088
See application file for complete search history.

(56) References Cited

U.S. PATENT DOCUMENTS

| | | | | |
|---|---|---|---|---|
| 8,060,596 B1* | 11/2011 | Wootton | ............. | G06F 21/6218 |
| | | | | 709/223 |
| 8,229,873 B1* | 7/2012 | Dolan | ............. | G06Q 30/00 |
| | | | | 706/45 |
| 10,387,784 B2* | 8/2019 | Majumdar | ............. | G06N 5/04 |
| 2013/0035985 A1* | 2/2013 | Gilbert | ............. | G06Q 10/06375 |
| | | | | 705/7.31 |
| 2017/0078169 A1* | 3/2017 | Bent | ............. | H04L 43/02 |
| 2017/0270428 A1* | 9/2017 | Zoldi | ............. | G06N 7/005 |
| 2018/0129929 A1* | 5/2018 | Shigenaka | ............. | G06N 3/0454 |
| 2018/0240020 A1* | 8/2018 | Madaan | ............. | G06F 16/2465 |

OTHER PUBLICATIONS

Sutskever, Ilya, et al., "Sequence to Sequence Learning With Neural Networks," Advances in Neural Information Processing Systems, Dec. 2014, 9 pages.

(Continued)

*Primary Examiner* — Kamran Afshar
*Assistant Examiner* — Imad Kassim
(74) *Attorney, Agent, or Firm* — Kilpatrick Townsend & Stockton LLP

(57) ABSTRACT

Disclosed systems and methods generate user-session representation vectors from data generated by user interactions with online services. A transformation application executing on a computing device receives interaction data, which is generated by user devices interacting with an online service. The transformation application separates the interaction data into session datasets. The transformation involves normalizing the session datasets by modifying the rows within each session dataset by removing event identifiers and time stamps. The application transforms each normalized session dataset into a respective user-session representation vector. The application outputs the user-session representation vectors.

20 Claims, 9 Drawing Sheets

(56) References Cited

OTHER PUBLICATIONS

Cho, Kyunghyun, et al. "On the Properties of Neural Machine Translation: Encoder-Decoder Approaches," Eighth Workshop on Syntax, Semantics and Structure in Statistical Translation (SSST-8), 2014, 9 pages.
Chung, Junyoung, et al, "Empirical Evaluation of Gated Recurrent Neural Networks on Sequence Modeling," Computer Science, Neural and Evolutionary Computing, Dec. 2014, 9 pages.
Lipton, Zachary C., et al, "A Critical Review of Recurrent Neural Networks for Sequence Learning" arXiv preprint arXiv:1506.00019, Jun. 5, 2015, 38 pages.
Hidasi, Balázs, et al. "Session-Based Recommendations With Recurrent Neural Networks," arXiv preprint arXiv:1511.06939 (2015), published as Conference Paper at ICLR, Mar. 29, 2016, 10 pages.
Holzinger, A., et al., "On the Generation of Point Cloud Data Sets: The First Step in the Knowledge Discovery Process", In: Holzinger, A., Jurisica, I. (eds.) Knowledge Discovery and Data Mining. LNCS, vol. 8401, Springer, Heidelberg 2014, 7 pages.
Singh, Gurjeet, et, al., "Topological Methods for the Analysis of High Dimensional Data Sets and 3d Object Recognition," Point Based Braphics, SPBG. Sep. 2007, 11 pages.
Bubenik, Peter, "Statistical Topological Data Analysis Using Persistence Landscapes", Journal of Machine Learning Research, vol. 16, Issue , Jan. 2015, 26 pages.
Chazal, Frédéric, et a,. "Subsampling Methods for Persistent Homology", International Conference on Machine Learning, ICML 2015, 9 pages.

\* cited by examiner

US 10,726,325 B2

FACILITATING MACHINE-LEARNING AND DATA ANALYSIS BY COMPUTING USER-SESSION REPRESENTATION VECTORS

TECHNICAL FIELD

This disclosure relates generally to artificial intelligence used in data analysis. More specifically, but not by way of limitation, this disclosure relates to computing suitable vector-encoded representation of data generated by user interactions with online services (e.g., digital marketing data sets).

BACKGROUND

Certain analysis techniques may be used for analyzing and deriving insights from user interaction data gathered from online services, such as digital marketing platforms. For example, interaction data can be used for predicting future user behavior. User interaction data may be represented as a sequence of event records, including, for example, categorical values (such as state, ZIP code, browser-type, etc.), numerical values (price, age, duration of use, etc.), or some combination thereof. Moreover, user interactions may be encoded as events (e.g., by encoding each individual user event as a separate vector) or by session (e.g., by encoding user interactions in an entire session into a common vector).

However, given the growth in the amount and complexity of data to be analyzed, existing analysis techniques are ineffective for deriving insights from interaction data. Hence, advanced analysis techniques may be used. One such technique is topological data analysis ("TDA"). TDA uses topology, the sub-field of mathematics concerned with the study of shape, to describe the shape or pattern of a set of data. But many advanced analysis techniques cannot operate directly on interaction data. More specifically, advanced techniques require data sets with fixed-dimension records and numerical fields, such that the data can be encoded in vectors forming a point cloud in a real Euclidian space. Differences in two sets of interaction data should be reflected by distances between the two corresponding vectors (which represent the interaction data sets).

In contrast, representation vectors are a suitable input for such advanced techniques. A representation vector is a set of data points in a coordinate system that includes various dimensions representing the user interactions. Interaction data must be transformed into representation vectors. However, existing solutions for transforming interaction data into representation vectors present disadvantages. For instance, existing solutions are unable to encode categorical data in a manner such that the data is adequately represented in a Euclidian space. Existing solutions are also unable to compute or otherwise provide a distance reflecting two categorical variable values (e.g., a designation of "California" versus "Florida"). Additionally, the distance between values in different categories must be taken into consideration. For example, the distance between values within one category, e.g., male versus female, may differ from the distance between different possible values within another category, e.g., age group. The mixing of real and categorical data, and numerical data with differing scales poses a similar problem.

Accordingly, there exists a need to effectively transform user interaction data into a suitable form for advanced analysis techniques, specifically representation vectors.

SUMMARY

Systems and methods are disclosed herein for using one or more computing devices to transform interaction data generated by online services (e.g., digital marketing session datasets) into user-session representation vectors that facilitate the application of analytical algorithms such as topological data analysis ("TDA") to the interaction data. For example, a transformation application executing on a computing device receives interaction data, which is generated by user devices interacting with an online service. The transformation application separates the interaction data into session datasets. The transformation involves normalizing the session datasets by modifying the rows within each session dataset by removing event identifiers and time stamps. The application transforms each of the normalized session datasets into a respective user-session representation vector. The application outputs the user-session representation vectors.

These illustrative embodiments are mentioned not to limit or define the disclosure, but to provide examples to aid understanding thereof. Additional embodiments are discussed in the Detailed Description.

BRIEF DESCRIPTION OF THE FIGURES

Features, embodiments, and advantages of the present disclosure are better understood when the following Detailed Description is read with reference to the accompanying drawings.

DETAILED DESCRIPTION

Figure 1:
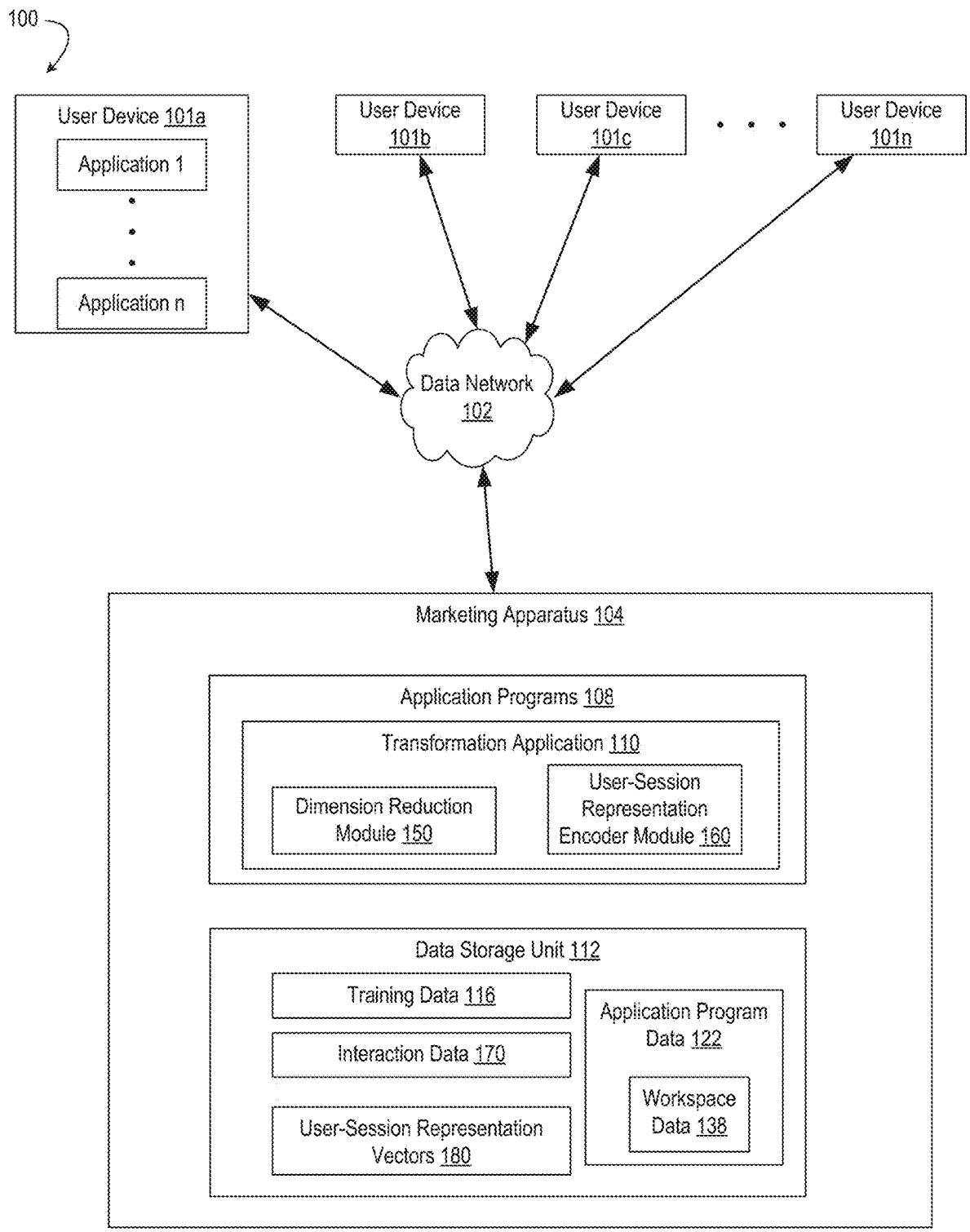
FIG. 1 is a diagram depicting an example of a network environment for computing user-session representation vectors suitable for topological data analysis of marketing data, according to certain embodiments.

As discussed above, the present disclosure includes systems and methods for encoding interaction data, or data generated by users' interaction within online services (e.g., digital marketing session datasets), such that topological data analysis ("TDA") and other suitable machine-learning techniques may be used to analyze the interaction data. As explained above, conventional solutions for encoding interaction data may result in sub-optimal results if the interaction data is analyzed using techniques reliant on the concept of distance in a vector space (e.g., TDA). For example, existing solutions for transforming interaction data into representation vectors are unable to encode categorical data in a manner that is adequately represented in a Euclidian space. By contrast, embodiments described herein are used for transforming interaction data with categorical variables into user-session representation vectors. Each user-session representation vector represents a session of interaction data that has been normalized by removing unnecessary data and transformed in such a way that the Euclidian distance within a multi-dimensional vector space represents the dissimilarity between different sequences in the interaction data.

The following non-limiting example is provided to introduce certain embodiments. In this example, a computing system facilitates the application of TDA and other advanced methods to interaction data. TDA has been applied in domains such as medical imaging, but has not been applied on a wide-scale to data for analyzing the performance of online services, such as marketing data. In particular, the computing system transforms the interaction data into a representation vector suitable for TDA. The computing system receives interaction data as input and outputs user-session representation vectors that are generated from the interaction data. Interaction data includes data for users' interactions with a website or other application, and can contain categorical or numerical components. If a user interacts with a website or application, interaction data describing one or more aspects of those interactions may be recorded. Examples of this interaction data include a referring URL (i.e., which website a user visited immediately before visiting the current one), web page elements that user clicked on, time stamps identifying when interactions occurred, the browser type, an operating system, etc. Some categories of interaction data are numeric (e.g., a browser version number), and others categories of interaction data are non-numeric (e.g., the user's sex).

The user-session representation vectors produced from the interaction data include various dimensions that represent a sequence of user interactions with an online service during a session in which a user accesses the online service. In some embodiments, user-session representation vectors are standardized versions of interaction datasets, which may include a mix of categorical and numerical features.

The user-session representation vectors are points in a multi-dimensional space. In a non-limiting example involving the concept of distance in a multi-dimensional space, increased similarity between sessions with respect to categorical variables is indicated by decreased distance between the points defined by the corresponding user-session representation vectors, and vice versa. Hence, the methods disclosed herein preserve the distance between vectors containing different categorical values.

To generate the user-session representation vectors, the computing system transforms the interaction data into normalized session data that is suitable for encoding into the user-session representation vectors. For instance, the computing system divides the interaction data by session, each session containing multiple event records. Dividing the interaction data by session may involve dividing event records into time-based categories (e.g., by separating two user event records that occur more than five minutes apart into different sessions). Each session contains a sequence of rows.

The computing system also removes extraneous data that may be unnecessary for encoding certain interaction data into user-session representation vectors. For instance, if user identifier fields and time stamps are unnecessary (from the perspective of the computing system) because the interaction data has been organized by session, these user field identifiers and time stamps are removed. The numerical fields (e.g., zip code) are binned, i.e., categorized based on ranges of values and replaced with a new value representing the range. Each row is encoded into an intermediate vector. In this manner, the computing system generates, for each session, a corresponding set of intermediate vectors representing the session.

In the process of binning and encoding, the computing system maintains the concept of distance (i.e. greater dissimilarity of data resulting in greater Euclidian distance between the vectors). For example, the distance between ZIP codes is numerical, whereas the difference between male and female is categorical. Further, numerical data can also be problematic if the scales of different numerical variables differ, thereby also causing a problem with Euclidian distance. The computing system encodes the binned and encoded data into the user-session representation vectors using one or more suitable machine-learning algorithms (e.g., a recurrent neural network ("RNN")). The user-session representation vectors are compact representations wherein the distance between categorical variables is preserved.

As used herein, the term "session" refers to a particular grouping of data representing a user's online activity, delimited by activity, time, or by other means. For example, a session may represent the events a user performed while active on a particular website. In another example, a session may represent a sequence of events from clicking on a website to making a purchase.

As used herein, the term "interaction data" is data generated during interactions with online services, and may include, for example, users' clicks, referring URL, time stamp, etc. In one example, a website cookie may be active on a user's browser, tracking the user's activity on a particular site, whether the user made a purchase, and if so, what item the user purchased. Interaction data may also include more sophisticated components, such as the user's location, or age-group, which provide even greater value to marketers.

As used herein, the term "user-session representation vectors" refers to a set of data points in a coordinate system that includes various dimensions representing user interactions. In some embodiments, a set of user-session representation vectors has the same number of dimensions. The user-session representation vectors include numerical fields that correspond to categorical or other non-numerical values. User-session representation vectors thus contain information about one or multiple user's interactions online, organized by session. User-session representation vectors enable the application of topological data analysis ("TDA").

Referring now to the drawings, FIG. 1 depicts an example of a network environment 100 for transforming interaction data 170 into user-session representation vectors 180, according to certain embodiments of the present disclosure. In the example depicted in FIG. 1, various user devices 101a-n access a marketing apparatus 104 via a data network 102. The marketing apparatus 104 executes one or more application programs 108, which may include one or more transformation applications 110. The transformation application 110 includes one or more dimension reduction modules 150 (or other suitable program code) and one or more user-session representation encoder module 160 (or other suitable program code) for transforming interaction data 170 into user-session representation vectors 180.

Various methods can be used for transforming interaction data 170 into user-session representation vectors. In a non-limiting example, interaction data 170 contains details about users' interactions with an online service. If a user interacts with a website or application, information about one or more interactions with the online service that occur in that session are recorded. A transformation application 110 uses various methods including machine-learning techniques to transform interaction data 170 into user-session representation vectors 180.

Some embodiments of the network environment 100 include user devices 101a-n. Examples of a user device include, but are not limited to, a personal computer, a tablet computer, a desktop computer, a processing unit, any combination of these devices, or any other suitable device having one or more processors. A user of a user device 101 uses various products, applications, or services supported by the marketing apparatus 104 via the data network 102.

The marketing apparatus 104 includes one or more devices that provide and execute one or more engines for providing one or more digital experiences to the user. The marketing apparatus 104 can be implemented using one or more servers, one or more platforms with corresponding application programming interfaces, cloud infrastructure, and the like. In addition, each engine can also be implemented using one or more servers, one or more platforms with corresponding application programming interfaces, cloud infrastructure, and the like.

Each of the user devices 101a-n is communicatively coupled to the marketing apparatus 104 via the data network 102. Examples of the data network 102 include, but are not limited to, internet, local area network ("LAN"), wireless area network, wired area network, wide area network, and the like.

The marketing apparatus 104 includes a data storage unit 112. The data storage unit 112 can be implemented as one or more databases or one or more data servers. The data storage unit 112 includes the interaction data 170, the user-session representation vectors 180, and the training data 116 that is used by the dimension reduction modules 150, user-session representation encoder module 160, and other engines of the marketing apparatus 104, as described in further detail herein.

The marketing apparatus 104 hosts one or more application programs 108, which can include the transformation application 110, to facilitate the creation of digital experiences for consumers or other end users. The marketing apparatus 104 provides the applications (e.g., the transformation application 110) as a software as a service ("SaaS"), or as a standalone application that can be installed on a computing device (e.g., a device used by a marketer), or as a combination of both. In addition, a workspace is included within each application program. The workspace data 138, which is included within application program data 122, includes settings of the application program, settings of tools or settings of user interface provided by the application program, and any other settings or properties specific to the application program.

Figure 2:
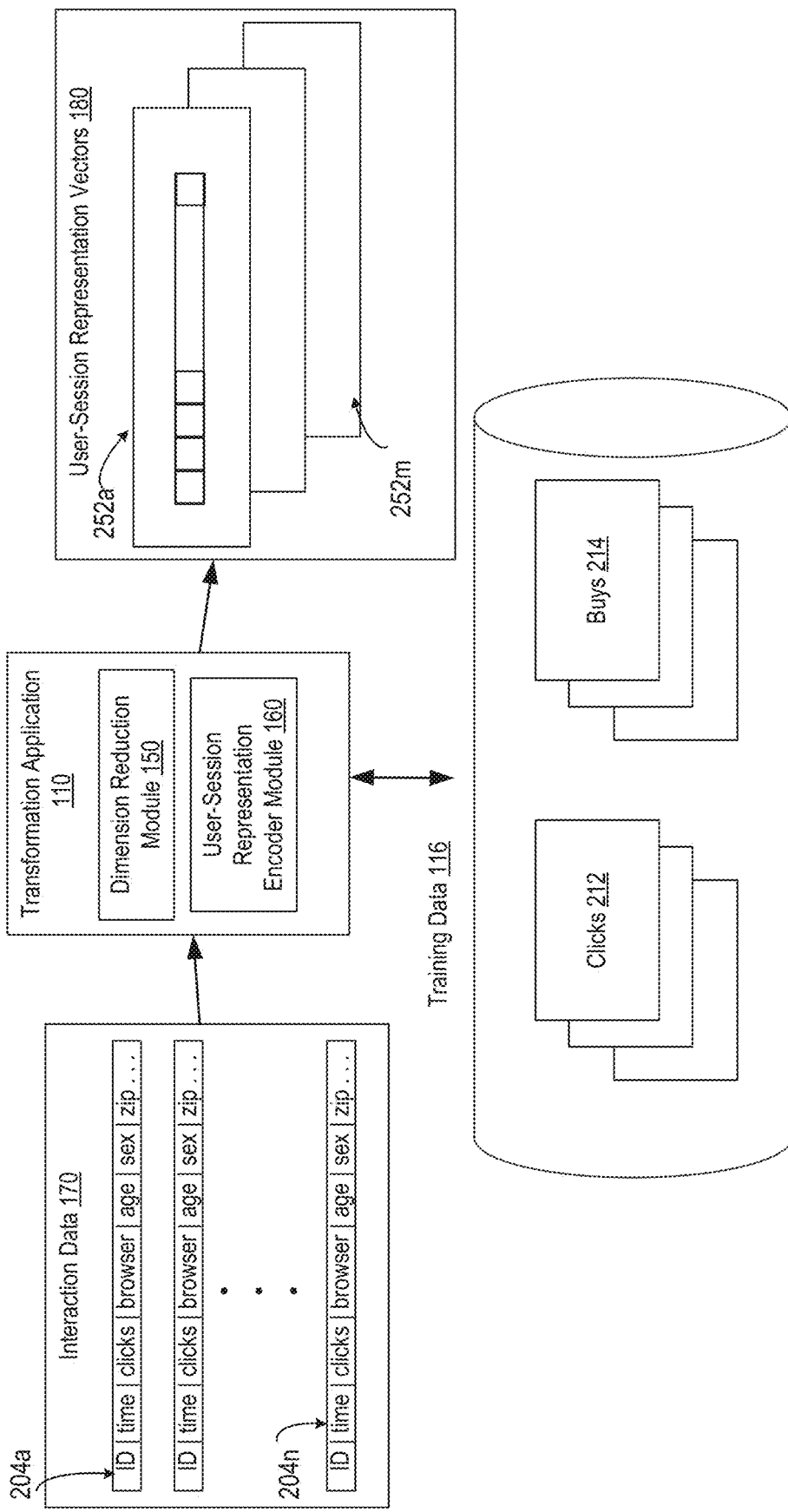
FIG. 2 is a flow chart depicting an example of a method for computing user-session representation vectors suitable for topological data analysis of marketing data, according to certain embodiments.

Embodiments of the current invention use various methods to transform interaction data 170 into user-session representation vectors 180. User-session representation vectors 180 facilitate the application of TDA and other advanced methods by transforming interaction data 170 into a representation vector suitable for TDA. For example, FIG. 2 is a flow chart depicting an example of a communication flow for computing user-session representation vectors 180 that are suitable for topological data analysis of marketing data, according to certain embodiments. In this example, the transformation application 110 (or other suitable application) receives the interaction data 170 as input. The transformation application 110 generates user-session representation vectors 180 from the interaction data 170.

The interaction data 170 contains details about users' interactions with an online service. Every time a user interacts with a website or application, that session may be recorded. More specifically, the interaction data 170 contains multiple event records 204a-n. Examples of information included in an event record 204a-n include some or all of the following information: where the user clicked on a web page, the browser type, a user's age group, sex, approximate geography, referring URL (i.e. which website a user visited immediately before visiting the current one), browser type, operating system, a time stamp, etc. Information may be gathered from cookies, GPS, location shared, third party data, IP address, or other methods. Marketing data may also include data from Adobe Audience Manager® or a similar application.

The user-session representation vectors 180 are a set of data points in a coordinate system that includes various dimensions representing the user interactions. The user-session representation vectors 180 include one user-session representation vector 252 for each of n sessions.

The transformation application 110 includes program code that is executable by a processing device to perform one or more operations described herein. In some embodiments, transformation application 110 is a stand-alone application. In other embodiments, the transformation application 110 includes one or more modules incorporated into another application. The transformation application 110 may be executed at one or more computing devices, which may be stand-alone computing devices, a set of computing devices configured for cloud computing or other distributed computing, or some combination thereof. (An example of a computing system that can execute the transformation application 110 is described herein with respect to FIG. 9).

The embodiments described herein use machine-learning techniques, and thus are trained. The transformation application 110 uses the training data 116, or other data, to train the machine-learning algorithms. The training data 116 includes any suitable data structure (but not limited to) a database or set of tables. The training data 116 includes data describing user behavior and events resulting therefrom, and may be used to train any machine-learning algorithms, for example, those in the user-session representation encoder module 160. For instance, in the example depicted in FIG. 2, the training data 116 includes known user data such as clicks 212 and resulting buys 214.

In some embodiments, the training data 116 is stored on a computing device that executes the transformation application 110. In additional or alternative embodiments, the training data 116 is accessed via a network by a computing device that executes the transformation application 110. A database of training data 116 is obtained or generated for training the dimension reduction module 150. Similarly, the same or a different set of training data 116 may be obtained or generated for training the user-session representation encoder module 160.

Figure 3:
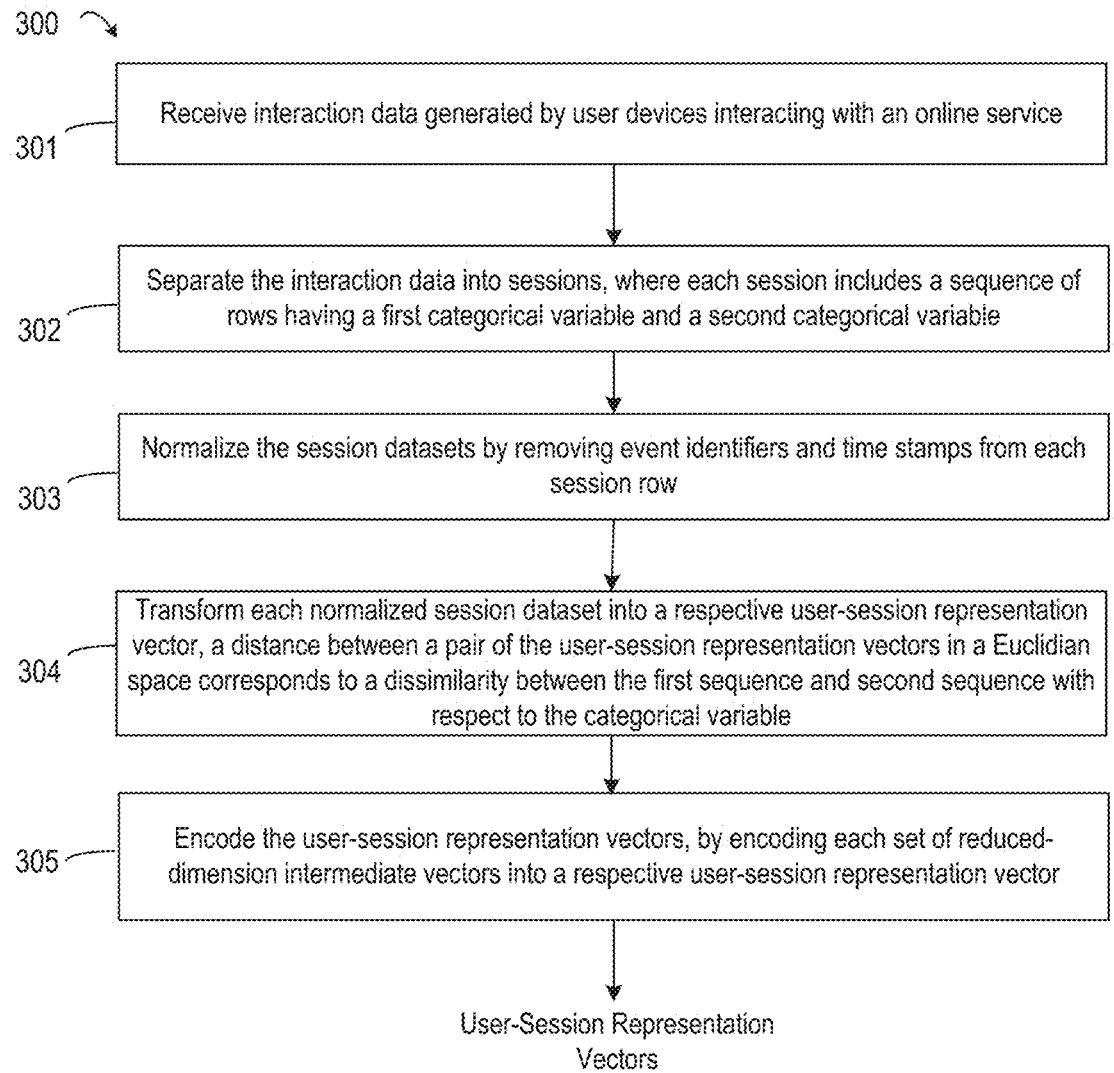
FIG. 3 is a flow chart depicting an example of a method for transforming interaction data into the user-session representation vectors depicted in FIG. 2, according to certain embodiments.

An example of the transformation process is depicted in FIG. 3. FIG. 3 is a flow chart depicting an example of a method 300 for transforming interaction data into the user-session representation vectors 180, according to certain embodiments. In some embodiments, one or more processing devices implement operations depicted in FIG. 3 by executing suitable program code (e.g., the transformation application 110). For illustrative purposes, the method 300 is described with reference to the examples depicted in FIGS. 2 and 4. Other implementations, however, are possible.

At blocks 301-304, the method 300 involves transforming the interaction data into a format suitable for encoding the user-session representation vectors 180. At block 301, the method 300 involves receiving interaction data 170. For example, the transformation application 110 is executed by one or more suitable processing devices, and thereby accesses the interaction data 170 from a suitable non-transitory computer-readable medium. At least some of the interaction data 170 is not organized by session. For instance, the interaction data 170 may be a list of event records 204*a*-*n* that lack any delineation between different sessions.

The interaction data 170 includes data generated by interactions with an online service by one or more users via one or more sessions with the online service. The interaction data 170 includes data for users' interactions with a website or other application. In some embodiments, the interaction data 170 includes categorical or numerical components. Each event record contains data relevant to that particular event. Examples of this data include an event identifier, clicks on content by a user, a browser type, an operating system, etc.

Figure 4:
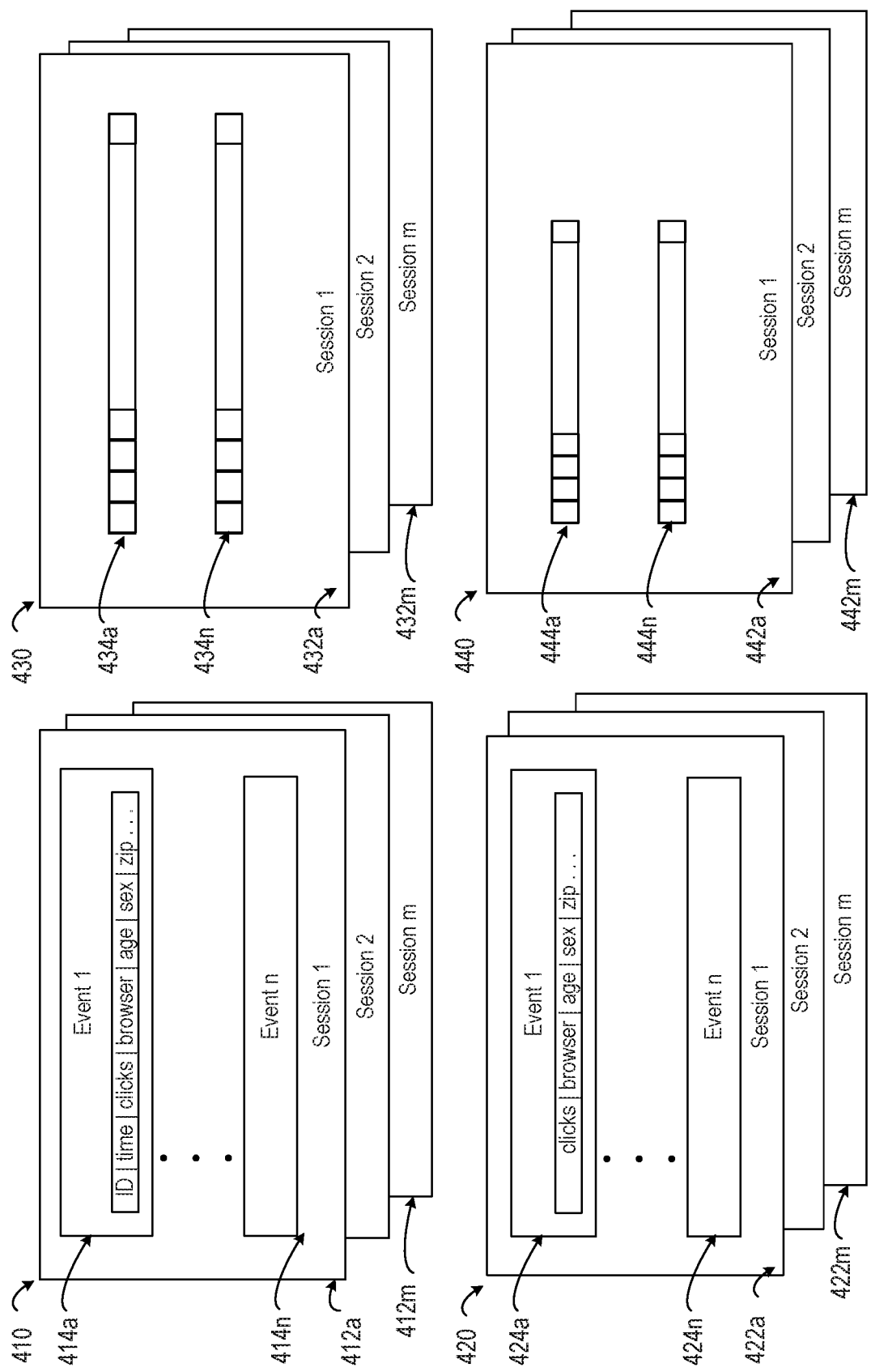
FIG. 4 is a diagram depicting exemplary data structures used at various stages of the method depicted in FIG. 3.

At block 302, the method 300 involves separating the interaction data 170 into sessions. Each session includes a sequence of rows. In some embodiments, each row includes at least a first categorical variable and a second categorical variable. The interaction data 170 contains multiple event records 204*a*-*n*, which may contain data from multiple sessions or multiple users. FIG. 4 depicts data structures used at various stages of method 300. The session data 410 is an example representation of the interaction data 170 that has been separated into sessions. The session data 410 contains sessions 412*a*-*m*, each of the sessions 412*a*-*m* containing session rows 414*a*-*n* for that particular session. (For illustrative purposes, the method 300 is described with using two categorical variables, but any number of categorical variables may be used.)

Interaction data may be identified and grouped into sessions using various methods. One method is sorting the interaction data by time stamp. Alternatively, sessions may be identified from web cookies, or other means. Although some sessions may be identified across a period of time that includes breaks, users may be inactive for a period of time that results in a split of the data into two different sessions. Such a split may be accomplished by separating data based on a time interval (e.g., three seconds, five minutes, etc.). Accordingly, if the data set contains a field for session identification (e.g., an identifier), the transformation application 110 groups the records by this identifier field. Otherwise, the transformation application 110 creates the session boundaries based on a time-division, i.e., splitting events that are before and after a predefined time threshold, e.g., five minutes. For example, a session 412 may contain session records 414*a*-*n* for a session determined by separating interaction data by time stamp.

Returning to FIG. 3, at block 303, the method 300 involves normalizing the session datasets by removing fields denoting event identifiers (e.g., user identification, identification of a particular browser, etc.) and time stamps from each session row within a session. FIG. 4 depicts the normalized session data 420 as example representations of the session data 410 that has been modified to remove fields denoting event identifiers and time stamps. More specifically, the normalized session data 420 contains modified normalized sessions 422*a*-*m*. Each of the modified normalized sessions 422*a*-*m* includes modified session rows 424*a*-*n*.

TDA algorithms or similar algorithms analyze data patterns rather than instances of data. TDA algorithms or similar algorithms may not use identifiers because the particular identity of the user who performed an action has less relevance (or no relevance) to the algorithms compared to the data representing user interactions. Similarly, TDA algorithms or similar algorithms may not require knowledge of the particular time that action occurred to determine these data patterns. In some embodiments, removing time stamps avoids causing similar sessions to seem like different sessions, e.g., two sessions being far apart in time but involving similar events. Two sessions with similar interaction data may be similar if, for example, a web server receives clicks in similar places on a similar page (e.g., for a similar purchase) by two different user devices involved in two different session. If the two sessions occurred at different times, the time stamps may erroneously suggest that the sessions are different for purposes of pattern analysis.

The transformation application 110 modifies the session data 410 and creates the normalized session data 420. More specifically, the transformation application 110 transforms through each of the sessions 412*a*-*m* into a corresponding one of the modified normalized session datasets 422*a*-*m*. For example, for each session 412*a*-*m*, the transformation application 110 removes identifiers, time stamps, or both from each of the session rows 414*a*-*n*. The transformation application 110 creates corresponding modified session rows 424*a*-*n*.

Returning to FIG. 3, at block 304, the method 300 further involves transforming each normalized session dataset 422*a*-*m* within the normalized session data 420 into a respective user-session representation vector. In some embodiments, the normalized session data 420 is first transformed into intermediate data 430 before it is encoded into user-session representation vectors 180. The distance between a pair of the user-session representation vectors in a Euclidian space corresponds to a dissimilarity between the first sequence and the second sequence with respect to the categorical variable. FIG. 4 depicts the intermediate data 430 as an example representation of the normalized session data 420, in which the normalized session datasets 422*a*-*m* have been encoded into corresponding intermediate sessions 432*a*-*m*. More specifically, for example, the transformation application 110 receives normalized session row 424*a*, translates the categorical fields (e.g., age group, sex, browser operating system, etc.), and outputs an intermediate session vector 434*a*, containing numerical data structures that represent the categorical data.

In some embodiments, the transformation application 110 uses one-hot encoding to implement this translation. For each of the normalized session datasets 422*a*-*m* within the normalized session data 420, the transformation application one-hot encodes categorical fields within each of the normalized session rows 424*a*-*n*, thereby creating a corresponding intermediate session vector 434*a*-*n*. One-hot encoding is the generation of a vector containing one Boolean column for each category. In one example, a vector indicating a browser operating system includes five dimensions, each of which corresponds to a particular type of operating system (e.g., Mac, PC, Android, iOS, or other). The value of a dimension is "1" if the operating system has the type corresponding to that dimension. For instance, a "Mac" operating system is represented as a vector [1 0 0 0 0], a "PC" operating system is represented as a vector [0 1 0 0 0], and so on.

In additional or alternative embodiments, for each modified session 422a-m within the normalized session data 420, the transformation application bins numerical fields in each of the normalized session rows 424aa-n. Data binning is a process whereby numerical values within an interval are replaced with a value representative of that interval. Numbers may be binned based on where they fall within ranges of numbers. For example, one bin may be 0-49, another may be 50-99, and a final bin may be 100-149. In this case, numbers that fall within these bins might be assigned bin values 0, 1, and 2 respectively. The transformation application 110 may treat the binned fields like categorical fields. In some embodiments, certain numerical fields are not modified for encoding into an intermediate vector.

In some cases, interaction data, and consequently modified session rows 424a-n may be missing some data elements. For example, interaction data from a third-party source may not be accessible at a time in which a TDA analysis must be performed (e.g., due to scheduling issues), a particular online service may not be configured to collect interaction data, or some interaction data may be lost in transmission due to problems with a data network. In some embodiments, missing data in the modified session rows 424a-n is treated like a new categorical value differing for each field. Alternatively, missing data may be encoded as a vector with dimensions set to 1/o, where o is the total number of distinct values of that categorical field. For example, for a modified normalized session row 424a with length z, the missing data may be encoded as a vector with dimensions 1/z.

The intermediate data 430 includes each of the intermediate sessions 432a-m corresponding to one of the modified normalized sessions 422a-m. Each of the intermediate sessions 432a-m contains a set of intermediate session vectors 434a-n after the encoding operations. For each modified session 422a-m within the normalized session data 420, the transformation application concatenates the one-hot encoded vectors corresponding to categorical fields, binned numerical fields, and numerical fields that are not binned in each of the modified session rows 424a-n, creating the intermediate session vectors 434a-n. For example, intermediate session vector 434a corresponds to session row 414a the session data 410 and modified normalized session row 424a in one of the normalized session data 420.

In some embodiments, the method 300 may further involve reducing the dimensionality of the intermediate vectors 434a-n within each intermediate session 432a-m. The reduced-dimension representation contains information for TDA or other analyses that has fewer dimensions (e.g., a smaller number of data fields). Dimensionality reduction is performed because user interaction data may contain very large data sets, which can cause problems for the machine-learning techniques used at block 305. For example, each session may contain multiple categorical fields, e.g., age, sex, ZIP code, whether the user is a first-time visitor, etc., each having multiple possible distinct values. The overall record is equivalent to a single categorical field whose total number of distinct values is the product of the number of distinct values of each original categorical field. Using a machine-learning technique on such a large dataset can result in unreasonably high vocabulary size, potentially resulting in a set of operations too computationally complex. Vocabulary size in the context of encoding user-session representation vectors refers to the number of possible categorical values in all the vectors combined. Accordingly, dimensionality reduction is helpful.

Dimensionality reduction thus makes learning the user-session representation vectors 180 feasible for large user interaction data-sets. The dimension reduction module 150 uses methods that preserve the concept of distance (i.e. greater dissimilarity of data resulting in greater Euclidian distance between the vectors) to make learning the user-session representation vectors 180 feasible. Returning to FIG. 4, the reduced-dimension intermediate session data 440 is an example representation of the intermediate data 430, in which each of the intermediate sessions 432a-m has been reduced in dimensionality into the one of the corresponding reduced-dimension sessions 442a-m. More specifically, the dimension reduction module 150 obtains the intermediate data 430. The dimension reduction module 150 reduces the dimensionality of each of the intermediate vectors 424a-n within each of the intermediate sessions 432a-m, thereby creating the reduced-dimension intermediate vectors 434a-n.

In some embodiments, the dimension reduction module 150 uses Principal Component Analysis ("PCA"). PCA uses orthogonal transformations to convert a set of possibly correlated variables into values of linearly uncorrelated variables. In some embodiments, for each of the intermediate sessions 432a-m, the dimension reduction module 150 provides the intermediate vectors 434a-n as input to the PCA algorithm. The PCA algorithm performs a linear mapping of the intermediate vectors into a lower-dimension space. The linear mapping of the intermediate vectors into a lower-dimension space can maximize or otherwise increase the variation of the intermediate vectors. The PCA algorithm outputs the reduced-dimension intermediate vectors 444a-n for each of the reduced-dimension intermediate vectors 442a-m for use in block 306.

In other embodiments, the dimension reduction module 150 may use a neural network such as an autoencoder or a variational autoencoder. An autoencoder may provide denser representation of the data set that includes the intermediate vectors by reducing the dimensionality of the intermediate vectors. An autoencoder is an artificial neural network used for the unsupervised learning of encoding certain data. For a given input, the autoencoder predicts as output the same data as is provided as input. In so doing, the autoencoder also creates a corresponding compressed representation of the input data, which is used by the dimension reduction module 150. An autoencoder may contain multiple layers, including an input layer, an output layer, and one or more internal layers. In some cases, the compressed representation is found in an internal layer of the autoencoder. Accordingly, in some embodiments, the dimension reduction module 150 uses an autoencoder to perform dimensionality reduction of the intermediate vectors. Accordingly, in some embodiments, for each intermediate session 432a-n, the dimension reduction module 150 provides the intermediate vectors 434a-m as input to the autoencoder. For each intermediate session 432a-m, the dimension reduction module 150 configures the autoencoder to predict the intermediate vectors 434a-n. The dimension reduction module 150 extracts the reduced-dimension intermediate vectors 444a-n for each set of reduced-dimension intermediate vectors 434a-n from the output of one of the internal states of the autoencoder.

Returning to FIG. 3, at block 305, the method 300 involves encoding the user-session representation vectors 180. The user-session representation encoder module 160 uses a neural network to encode each of the reduced-dimension intermediate sessions 442a-m into one of the user-session representation vectors 252a-m.

Any suitable neural network may be used with respect to the operation at block 306. One example of a suitable neural network is the RNN described in B. Hidasi et al. *Session-based recommendations with recurrent neural networks.* CoRR, abs/1511.06939, 2015), which is incorporated by reference herein. Such an RNN may be adapted for the learning of user-session representation vectors 180. For example, one of the user-session representation vectors 252a-m are generated by processing the sequence of reduced-dimension intermediate vectors 434a-n within one of the reduced-dimension normalized sessions 422a-m. An RNN may include an encoder and a decoder, both containing internal states. In some embodiments, one of the trained neural network's internal states (i.e., the hidden Gated Recurrent Units ("GRU") layers) may provide the user-session representation vectors 180. Another example of a suitable neural network is the Sequence-to-Sequence ("seq2seq") RNN described in K. Cho et al., *On the properties of neural machine translation: Encoder-decoder approaches.* arXiv preprint arXiv:1409.1259v2, 2014, which is incorporated by reference herein.

Either the RNN as disclosed by Hidasi, or the RNN as disclosed by Cho may be trained. Even though the training methods below are presented from the perspective of the seq2seq RNN as disclosed by Cho et al., the training methods are equally applicable to other architectures, including that proposed by Hidasi et al. Training data 116 may include, for example, data containing lists of clicks 212 and buys 214. The training data 116 may include whether a given user purchased a product, or what product the user purchased, for example.

Figure 5:
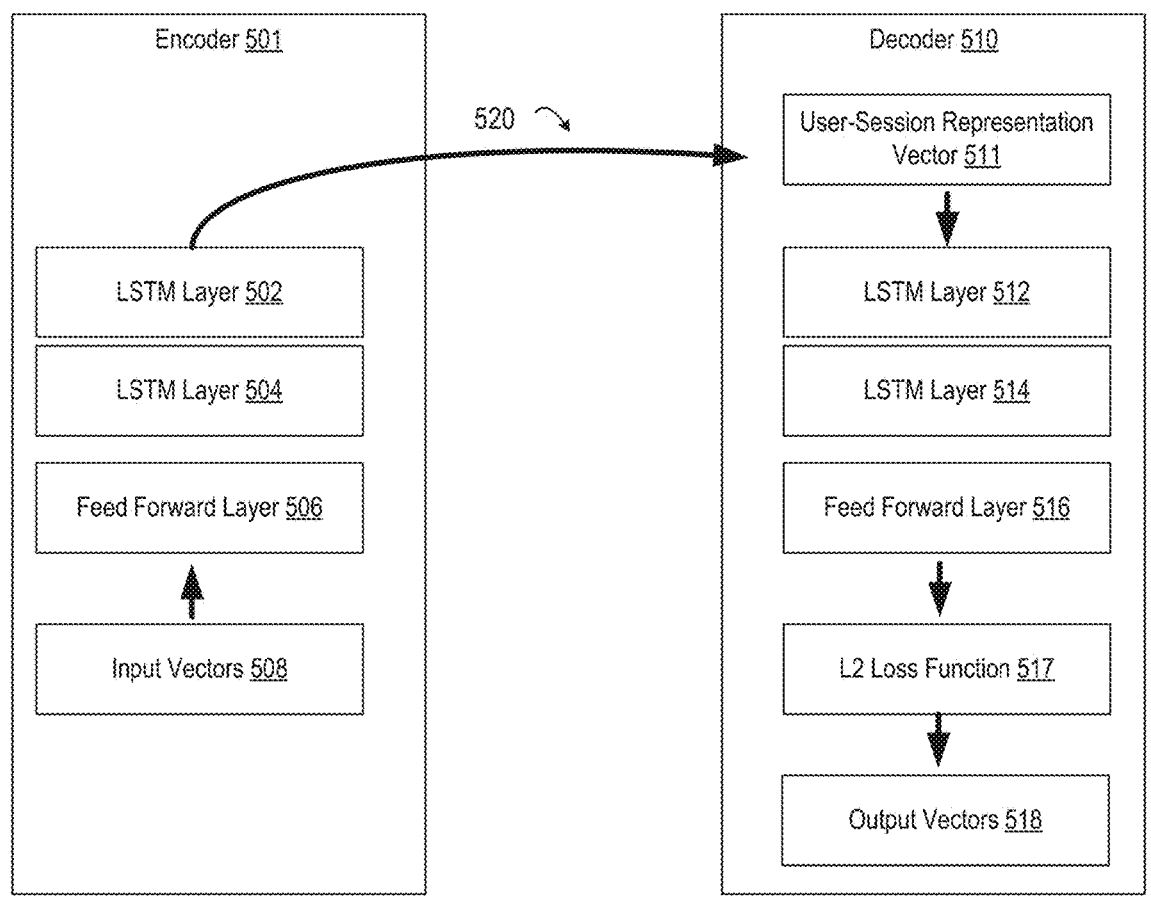
FIG. 5 is a diagram depicting an example of a neural network architecture used for learning user-session representation vectors, according to certain embodiments.

FIG. 5 is a diagram depicting the adaptation of the seq2seq network for learning the user-session representation vectors 180, according to certain embodiments. For example, for a reduced-dimension intermediate sessions 442a, the trained seq2seq network receives, as input, the reduced-dimension intermediate vectors 444a-n from the reduced-dimension intermediate sessions 442a. The trained seq2seq network encodes the corresponding user-session representation vector 252a. In some embodiments, the user-session representation vector 252a contains a sufficient amount of information to reproduce the corresponding session.

The trained seq2seq network is capable of encoding the user-session representation vectors 180. Training may take place session-by-session. For example the seq2seq network may be trained with one set of the reduced-dimension intermediate vectors 444a-n corresponding to one of the reduced-dimension sessions 442a-m.

A seq2seq network 500 used by the transformation application 110 may differ from other applications of a seq2seq network 500. Other applications may be used for transforming an input vector to a different output vector using both an encoder and a decoder, using the neural network's predictive ability. In contrast, the seq2seq network 500 is configured such that the decoder is trained to predict the input of the encoder. The internal state of the encoder is of interest in the encoding of user-session representation vectors 180.

The seq2seq network 500 includes an encoder 501 connected to an decoder 510. The encoder 501 and decoder 510 may contain multiple Long Short-Term Memory Units ("LSTM"), e.g., LSTM layers 502, 504, 512, and 514. An LSTM unit can remember values for either long or short durations of time. The seq2seq network is configured to predict the input vectors 508. Accordingly, the output vectors 518 may be identical or almost identical to the input vectors 508.

In some embodiments, the seq2seq network 500 is trained using one of the sets of reduced-dimension intermediate sessions 442a-m at a time and is ready to be used after one of the reduced-dimension intermediate sessions 442a-m has been processed. For example, the seq2seq network 500 may be provided to all of the reduced-dimension intermediate vectors 444a-n at one time, and is considered trained for the reduced-dimension intermediate session 442a when the all the reduced-dimension intermediate vectors 444a-n for a given reduced-dimension intermediate session 442a are processed.

For example, the seq2seq receives the input vectors 508, which correspond to one reduced-dimension intermediate vector 444a. The reduced-dimension intermediate vector 444a is processed by the feed-forward layer 506 and are passed through the LSTM layers 502 and 504. The encoder 501 is trained to predict the reduced-dimension intermediate vector 444b. Training the seq2seq network 500 continues with the reduced-dimension intermediate vector 444b as the input vector 580. The encoder 501 is trained to predict the reduced-dimension intermediate vector 444c. After all of the reduced-dimension intermediate vectors 444a-n are processed, the final encoder state 520 is provided as an input to the LSTM layers 512 and 514 of the decoder 510, and is passed through the feed-forward layer 516 of the decoder 510. The decoder 510 generates the output vectors 518. The output vectors 518 should be equal (or nearly equal) to the input vectors 508, because the seq2seq network 500 is being trained to reproduce the input vectors 508.

The final state of encoder 501 (e.g., the state at the LSTM layer 502) is the desired encoding of the input to the encoder 501. Accordingly, a session-based user-representation vector 511 is output by the encoder 501. An L2 loss function 517 is used to determine the difference between the input vectors 508 and the output vectors 518 generated from the session-based user-representation vector 511. If the output of the L2 loss function exceeds a threshold, one or more of the parameters of the seq2seq network 500 are adjusted, and the process described above with respect to FIG. 5 is iterated with the seq2seq network 500.

Figure 6:
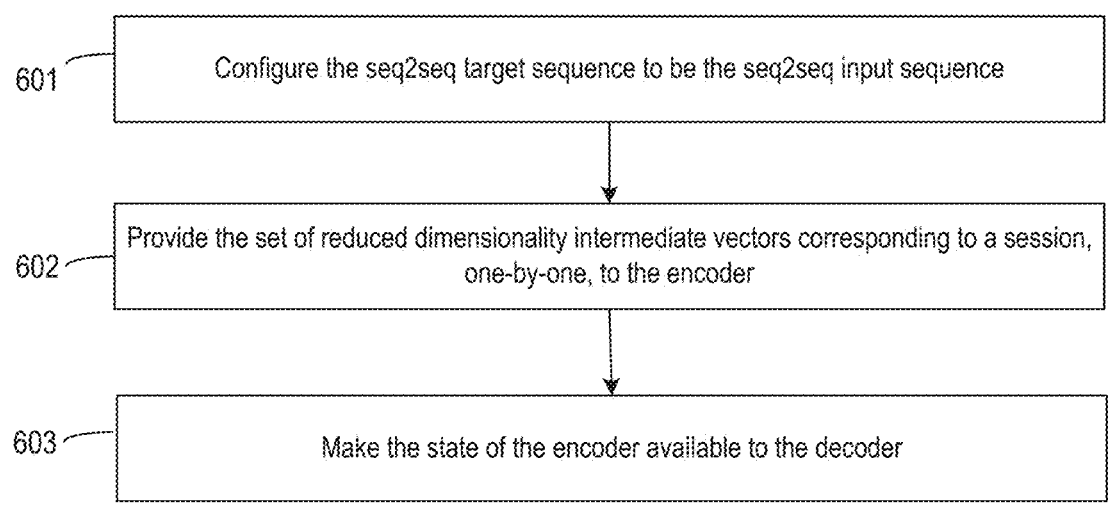
FIG. 6 is a flow chart depicting an example of a method for training the neural network architecture depicted in FIG. 5, according to certain embodiments.

FIG. 6 depicts an example of a method for training a neural network for generating a user-session representation vector. In the training process, the transformation application 110 transforms the interaction data as in blocks 301-304, and reduces the dimensionality of the intermediate vectors by the dimension reduction module 150, as described above with respect to block 305.

At block 601, the method 600 configures the neural network's target sequence (i.e., the desired output obtained from the seq2seq network 500) for the seq2seq network 500 to be the input to the encoder, i.e., the reduced-dimension intermediate vectors 444a-n for one of the reduced-dimension sessions 442a-m. The intermediate vectors 444a-n are identified as the target sequence because the internal state of the encoder 501 (i.e., a user-session representation vector) is the desired output of the neural network, and the seq2seq network 500 is being trained to reproduce the input vectors 508.

Figure 7:
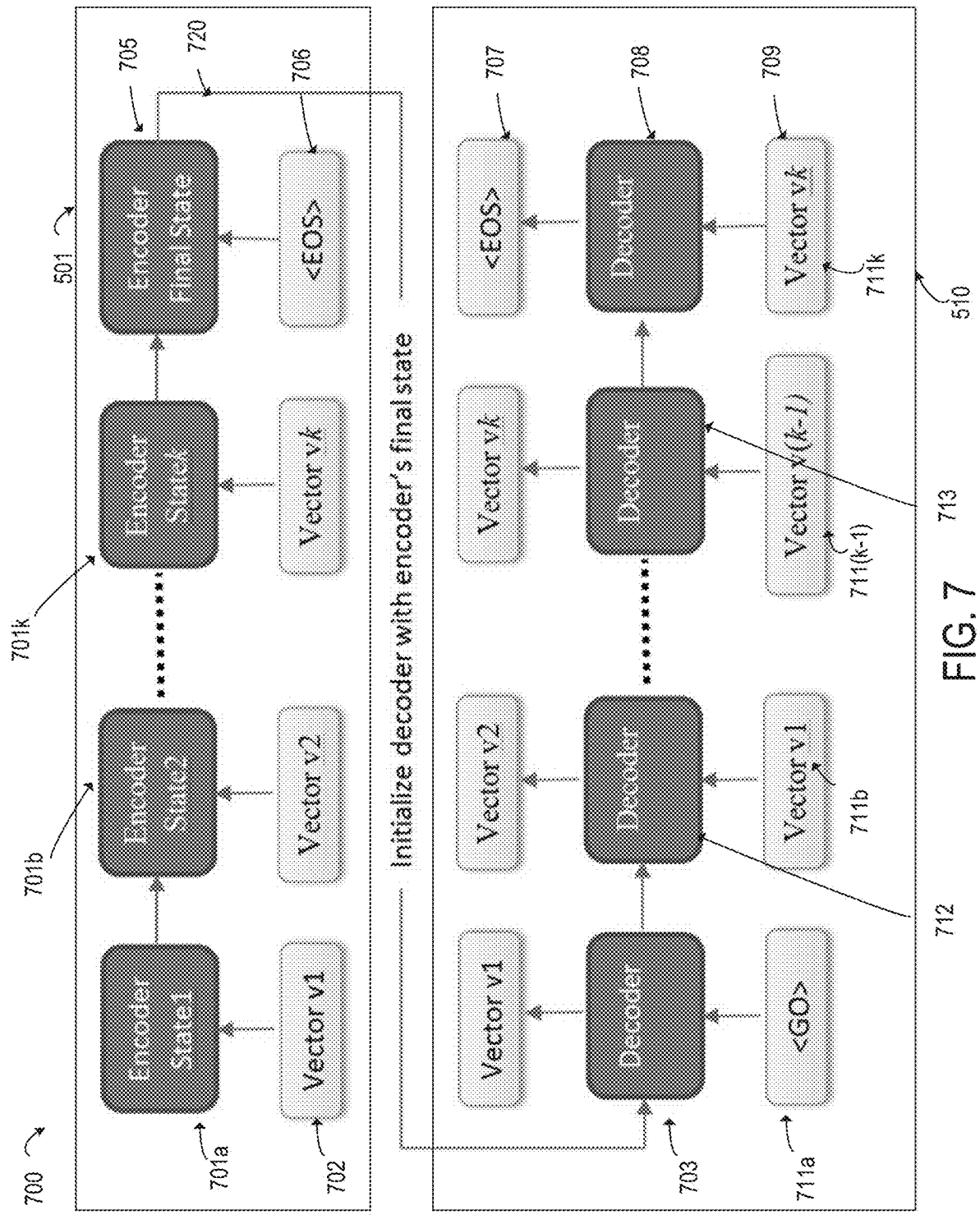
FIG. 7 is a diagram depicting the operation of the sequence-to-sequence Recurrent Neural Network architecture in time, according to certain embodiments.

At block 602, the method 600 provides the reduced-dimension intermediate vectors 444a-n, corresponding to a given reduced-dimension session 442a-m, one-by-one to the encoder 501. For example, FIG. 7 is a diagram depicting the operation of a seq2seq network 700 in more detail. FIG. 7 depicts the encoder 501 having multiple encoder states 702a-k and the decoder 510 having multiple decoder states 711a-k. FIG. 7 shows the process of reduced-dimension intermediate vectors 442a-n being provided on-by-one through the encoder 501 and decoder 510 networks.

More specifically, FIG. 7 shows each of the intermediate session vectors 434a-n being provided to the encoder states 701a-k, one by one. The seq2seq RNN processes one vector at once, updating the encoder states 701a-k. The encoder states 701a-k would therefore change following each input from an intermediate vector.

In a simplified example in which k=3, a set of three intermediate vectors corresponding to a particular session are used by the encoder 501 to generate a user-session representation vector. The first intermediate vector, for example, intermediate session vector 434a, is provided as an input to the encoder 501. Similarly, the second intermediate vector, intermediate session vector 434b, is provided as an input to the encoder 501 having a second encoder state 701b. The third intermediate vector, for example, intermediate session vector 434c, is provided as an input to the encoder 501 having a encoder state 701c. One or more parameters of the encoder 501 may be modified (as described with respect to FIG. 5 above) such that the final encoder state 520 represents an accurate encoding of the user-session representation vector corresponding to all the of intermediate session vectors 434a-n.

An end-of-sequence marker 706 is provided to the encoder 501 following a set of reduced-dimension intermediate vectors 434a-n that correspond to one of the intermediate sessions 442a-m. For example, the end-of-sequence marker 706 may be set to "1" to indicate the end of the input vector 508. Otherwise the end-of-sequence marker 706 is set to "0."

Returning to FIG. 6, at block 603, the method 300 provides the state of the encoder, represented by values of LSTM cells in the hidden layers of the encoder, to the decoder 510. Continuing the example described above with respect to FIG. 7, where k=3, the target sequence of the decoder is set to equal the input vectors 508 to the encoder 501. The third encoder state is passed to the decoder 510. The output vectors 518 from the encoder are identical or almost identical to the input vectors 508. If the error as measured by the L2 loss function 517 is too great, one or more parameters of the encoder 501 are iteratively modified (as described with respect to FIG. 5 above) such that encoder 501 has a third encoder state in which the third intermediate vector is accurately encoded as a corresponding session-based user presentation vector. In the event that the final encoder state 720 differs too greatly from the input to the encoder 501, manual intervention may be required to adjust the parameters of the neural network.

If the L2 loss function 517 is sufficiently small, the decoder 510 is trained to reproduce the sequence of reduced-dimension intermediate vectors from the final state 705 of the encoder 501. Reproducing the sequence of reduced-dimension intermediate vectors from the final state 705 of the encoder 501 involves processing the input from the final encoder state 720, one vector at a time, through the decoder states 711a-k. An additional node at the end of the encoder is set to "1" to denote the end-of-sequence symbol and "0" to denote a position in the sequence other than the end. If the decoder 510 is trained, the final encoder state 720 can be considered to be an encoding of one of the reduced-dimension sessions 442a-m.

In another embodiment, the seq2seq network 500 may be configured differently. For example, the encoder 501 and decoder 510 may work simultaneously with each other. More specifically, the decoder 510 may be trained to predict one vector at a time, rather than the entire set of vectors provided from the final encoder state 520. The encoder 501 may provide the output from the states immediately to the decoder 510 after the state in the encoder 501 is updated. For example, after receiving the first vector, corresponding to a reduced-dimension intermediate session 442a, the encoder 501 may pass the state to the decoder 510, which tries to predict the second vector in the sequence. Similarly, the state of the encoder 501 after processing the second vector, corresponding to the reduced-dimension intermediate session 442b, is passed to the decoder 510, and so on. Accordingly, at each stage, the decoder 510 is trained to predict the next vector in the sequence.

Experimentation and Testing

The embodiments described herein may be used by computing devices to transform interaction data generated by online services (e.g., digital marketing session datasets) into user-session representation vectors that facilitate the application of TDA. Applications in TDA include, for example, the calculation of a persistent homology to compute topical invariants and their relative persistence as scale varies. Persistent homology is a method for computing topological features of a space at different spatial resolutions. For example, such methods can be used to extract topological invariants to be used for predictive modelling, or alternatively in a larger data science analysis pipeline.

Experiments were performed that validate the functionality of the user-session representation vectors 252a-m produced by the transformation application 110 for their use in discovering trends by TDA techniques. Testing the transformation application 110 involves training the transformation application 110, specifically the user-session representation encoder module 160, then performing TDA analysis on the user-session representation vectors 180.

Training and testing data may include multiple user sessions and the results therefrom. For example, training data 116 may contain sequences of clicks 212, and the resulting buys 214. Training data 116 may also include information about the items viewed or purchased by a user, such as item and category identification numbers for products.

More specifically, training the RNN used by the user-session representation encoder module 160 involves training the user-session representation encoder module 160 within the transformation application 110. The training data 116, which is in the form of interaction data 170, is provided to the transformation application 110, wherein it is transformed, passed through the dimension reduction module 150, then provided as training data to the user-session representation encoder module 160. More specifically, the example test data with clicks and buys may be separated into the data containing clicks only, used as training to for the user-session representation encoder module 160.

Different testing configurations are possible. As discussed, user-session representation vectors 180 may be used for TDA analysis. In one example, the trained user-session representation encoder module 160 may be used on a data set segregated by date and the persistent homology of session-vectors may be computed for each day separately. Persistent homology is a method for computing topological features of a space at different spatial resolutions.

Figure 8:
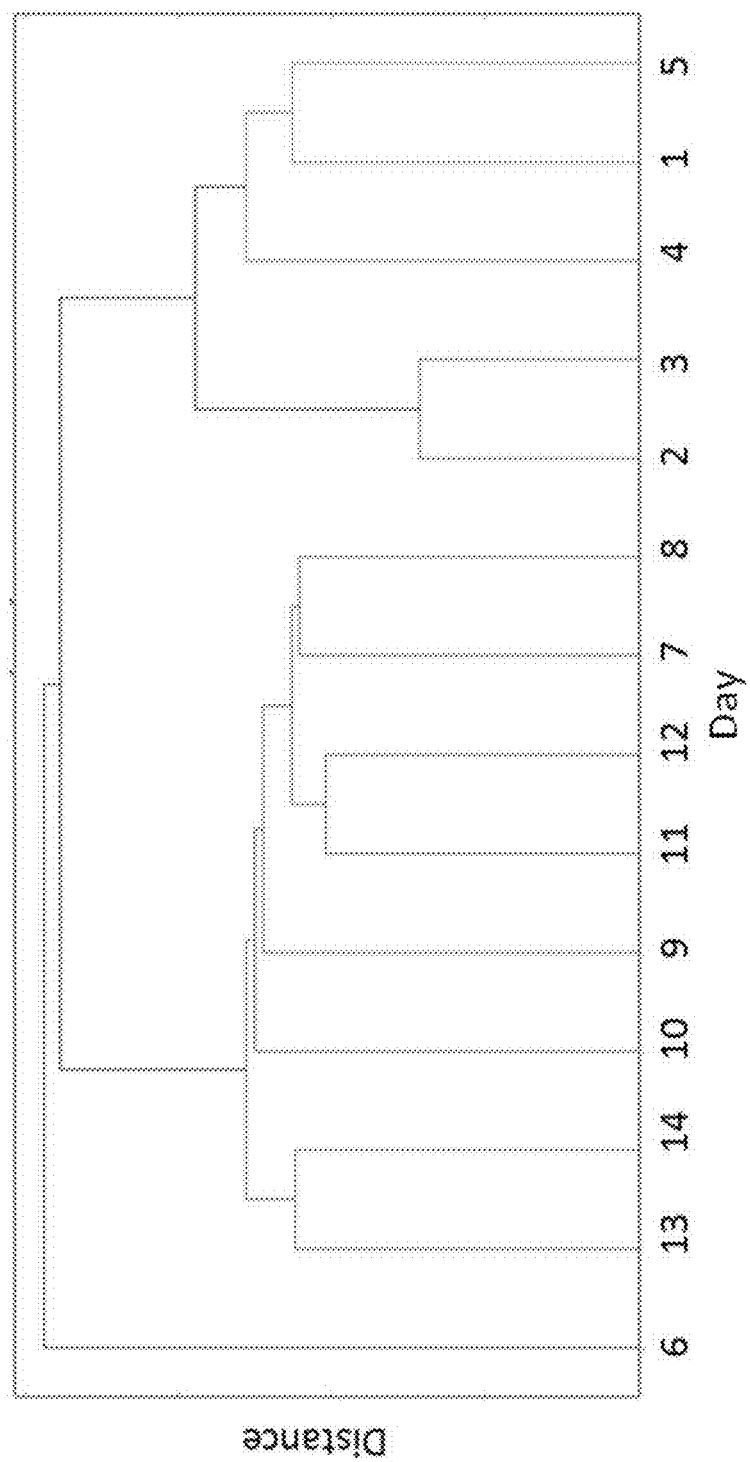
FIG. 8 is a diagram depicting the single-linkage-clustering output of persistent homology diagrams for an example of a test data set.

FIG. 8 describes some testing results from the use of the user-session representation vectors 180 in topological data analysis, specifically the calculation of persistent homology from data sets. More specifically, FIG. 8 is a dendogram depicting the single-linkage-clustering output of persistent homology diagrams for an example of a test data set. In this data set, for example, the clustering shows that a clear demarcation exists between the first 5 days, last 8 days and the unique date 6th April. TDA analysis determined in this case that the 6th of April has a maximum number of clicks and buys, without the use of the information relating to the purchased items.

In another example, the trained user-session representation encoder module 160 may be tested by separating testing data resulting in a buy ("buy data") from testing data not involving any purchase ("no-buy data"). For each data set, the transformation application 110 obtained user-session representation vectors 180 by processing only the click data for each dataset. TDA techniques were used to calculate persistent homology for each day of both the buy and no-buy datasets. In order to determine whether persistent homology captured the essential differences between the two datasets, the day-wise average H0 and H1 lengths of the two data sets is compared. H0 is a homology class of dimension zero and then length is measured in terms of the scale parameter of Persistent Homology. Similarly, here H1 implies homology class of dimension one.

A one-sided paired t-test may be used to determine the statistical significance of the hypothesis that average H0 length and average H1 length are greater in sessions having a buy compared to those without a buy. The statistical significance is 99.9% for the hypothesis being true for the H0 case, and 97.5% for the H1 case. Accordingly, the user-session representation vectors 180 facilitated topological data analysis.

The above experiments validate that the encoding method provides user-session representation vectors 180 that capture essential properties of the sessions. The user-session representation vectors enabled the automatic discovery of insights. Accordingly, the transformation application 110 is shown to be a valuable tool for transforming interaction data into user-session representation vectors 180.

Figure 9:
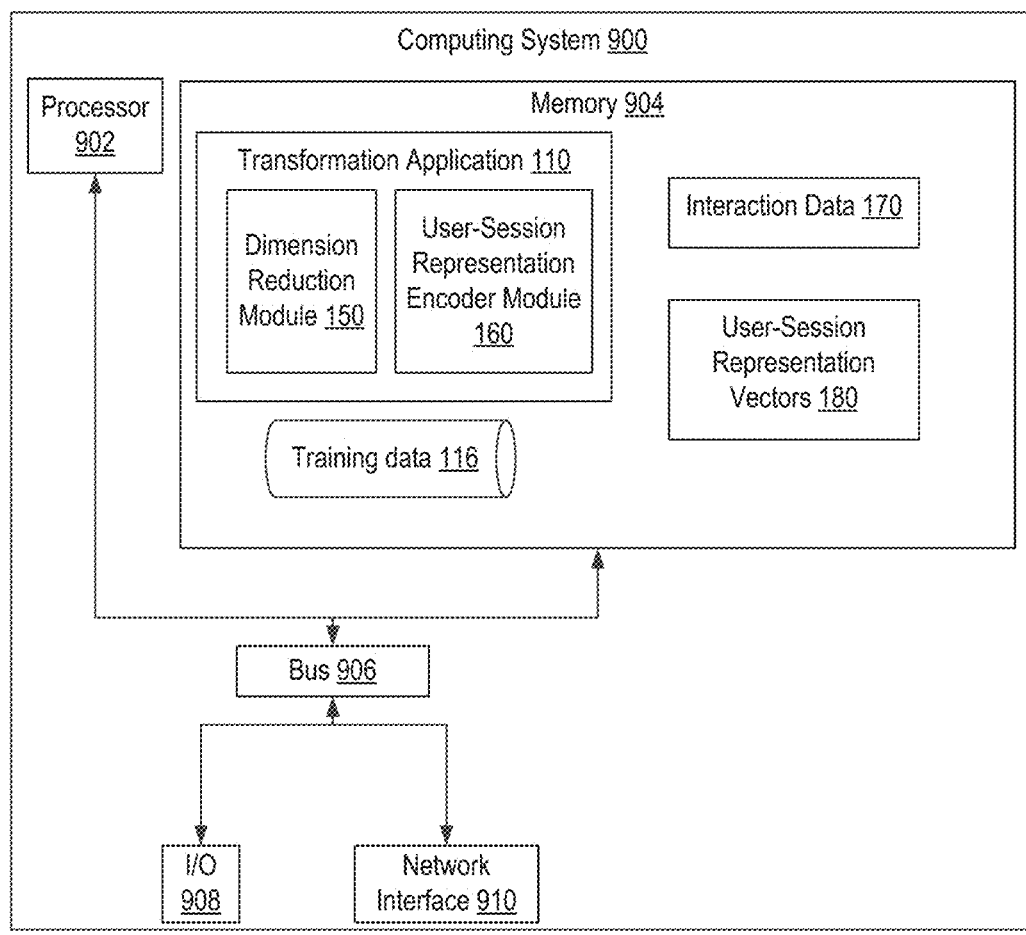
FIG. 9 is a diagram depicting an example of a system environment for transforming interaction data into user-session representation data according to certain embodiments.

Example of a Computing System for Transforming Interaction Data to User-Session Representation Vectors Any suitable computing system or group of computing systems can be used for performing the operations described herein. For example, FIG. 9 depicts examples of computing system 900 that executes a transformation application 110. In some embodiments, the computing system 900 also executes the transformation application 110, as depicted in FIG. 9. In other embodiments, a separate computing system having devices similar to those depicted in FIG. 9 (e.g., a processor, a memory, etc.) executes the transformation application 110.

The depicted example of a computing system 900 includes a processor 902 communicatively coupled to one or more memory devices 904. The processor 902 executes computer-executable program code stored in a memory device 904, accesses information stored in the memory device 904, or both. Examples of the processor 902 include a microprocessor, an application-specific integrated circuit ("ASIC"), a field-programmable gate array ("FPGA"), or any other suitable processing device. The processor 902 can include any number of processing devices, including a single processing device.

The memory device 904 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 900 may also include a number of external or internal devices, such as input or output devices. For example, the computing system 900 is shown with one or more input/output ("I/O") interfaces 908. An I/O interface 908 can receive input from input devices or provide output to output devices. One or more busses 906 are also included in the computing system 900. The bus 906 communicatively couples one or more components of a respective one of the computing system 900.

The computing system 900 executes program code that configures the processor 902 to perform one or more of the operations described herein. The program code includes, for example, the transformation application 110, or other suitable applications that perform one or more operations described herein. The program code may be resident in the memory device 904 or any suitable computer-readable medium and may be executed by the processor 902 or any other suitable processor. In some embodiments, the transformation application 110 is stored in the memory device 904, as depicted in FIG. 9. In additional or alternative embodiments, one or more of the transformation application 110, dimension reduction module 150, and the user-session representation encoder module 160 are stored in different memory devices of different computing systems. In additional or alternative embodiments, the program code described above is stored in one or more other memory devices accessible via a data network.

The computing system 900 can access one or more of the training data 116 and the transformation application 110 in any suitable manner. In some embodiments, some or all of one or more of these data sets, models, and functions are stored in the memory device 904, as in the example depicted in FIG. 9. For example, a computing system 900 that executes the dimension reduction module 150 or user-session representation encoder module 160 can provide access to the training data 116 by external systems that execute the transformation application 110.

In additional or alternative embodiments, one or more of these data sets, models, and functions are stored in the same memory device (e.g., one of the memory device 904). For example, a common computing system, such as the marketing apparatus 104 depicted in FIG. 1, can host the transformation application 110, dimension reduction module 150, and user-session representation encoder module 160. In additional or alternative embodiments, one or more of the programs, data sets, models, and functions described herein are stored in one or more other memory devices accessible via a data network.

The computing system 900 also includes a network interface device 910. The network interface device 910 includes any device or group of devices suitable for establishing a wired or wireless data connection to one or more data networks. Non-limiting examples of the network interface device 910 include an Ethernet network adapter, a modem, and the like. The computing system 900 is able to communicate with one or more other computing devices (e.g., a computing device executing a transformation application 110) via a data network using the network interface device 910.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, those skilled in the art, upon attaining an understanding of the foregoing, may readily produce alterations to, variations of, and equivalents to such embodiments. Accordingly, the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for generating user-session representation vectors from user interaction data, the method comprising:

receiving, by a processing device, interaction data comprising a first sequence and a second sequence, generated by user devices interacting with an online service via a data network;

separating, by the processing device, the interaction data into session datasets, each of the session datasets comprising a categorical variable;

normalizing, by the processing device, the session datasets by removing event identifiers and time stamps;

transforming, by the processing device, each normalized session dataset into a respective user-session representation vector, wherein a distance between a pair of the user-session representation vectors in a Euclidian space corresponds to a dissimilarity between the first sequence and the second sequence with respect to the categorical variable, wherein the transforming comprises:

converting each session data set into a set of intermediate vectors;

providing a respective set of intermediate vectors to an encoder of a Recurrent Neural Network that comprises a plurality of internal encoder states and a decoder;

updating at least one of the plurality of internal encoder states based on the set of intermediate vectors;

providing at least one of the plurality of internal encoder states to the decoder; and extracting the user-session representation vector from the at least one of the plurality of updated internal encoder states; and outputting, by the processing device, the user-session representation vectors for use by at least one of a machine-learning algorithm or a data analysis algorithm.

2. The method of claim 1, wherein transforming each normalized session dataset into the respective user-session representation vector comprises reducing, by the processing device, dimensionality of intermediate vectors in the respective set of intermediate vectors.

3. The method of claim 2, wherein reducing the dimensionality of intermediate vectors in the respective set of intermediate vectors comprises:

providing the intermediate vectors as inputs to an autoencoder, the autoencoder comprising plurality of internal states;

configuring the autoencoder to predict the intermediate vectors; and extracting the reduced-dimension intermediate vectors from an output of one of the plurality of internal states.

4. The method of claim 2, wherein reducing dimensionality of the intermediate vectors in the respective set of intermediate vectors comprises:

providing the intermediate vectors as inputs to a Principal Component Analysis algorithm;

performing a linear mapping of the intermediate vectors into a lower-dimension space, the lower-dimension space maximizing variation of the intermediate vectors and having a lower dimension as compared to the intermediate vectors, wherein the reduced-dimension intermediate vectors are output by the linear mapping; and outputting the reduced-dimension intermediate vectors from the lower-dimension space.

5. The method of claim 1, wherein the interaction data further comprises numerical data, and wherein transforming the interaction data into intermediate vectors further comprises assigning enumerated values to data falling within predetermined ranges of numerical values.

6. The method of claim 1, wherein the at least one of the machine-learning or the data analysis algorithm comprises a topological data analysis algorithm that uses the user-session representation vectors to derive topological invariants for predictive modelling.

7. The method of claim 1, further comprising:
obtaining an output by applying the machine-learning algorithm to the user-session representation vectors; and
providing the output to a user device.

8. A system comprising:
at least one non-transitory computer-readable medium storing user interaction data and computer-executable instructions for generating user-session representation vectors from user interaction data; and
a processing device communicatively coupled to the at least one non-transitory computer-readable medium for executing the computer-executable instructions, wherein executing the computer-executable instructions configures the processing device to perform operations comprising:
receiving, by the processing device, interaction data comprising a first sequence and a second sequence, generated by user devices interacting with an online service via a data network;
separating, by the processing device, the interaction data into session datasets, each of the session datasets comprising a categorical variable;
normalizing, by the processing device, the session datasets by removing event identifiers and time stamps;
transforming, by the processing device, each normalized session dataset into a respective user-session representation vector, wherein a distance between a pair of the user-session representation vectors in a Euclidian space corresponds to a dissimilarity between the first sequence and the second sequence with respect to the categorical variable, wherein the transforming comprises:
converting each session data set into a set of intermediate vectors;
providing a respective set of intermediate vectors to an encoder of a Recurrent Neural Network that comprises a plurality of internal encoder states and a decoder;
updating at least one of the plurality of internal encoder states based on the set of intermediate vectors;
providing at least one of the plurality of internal encoder states to the decoder; and
extracting the user-session representation vector from the at least one of the plurality of updated internal encoder states; and
outputting, by the processing device, the user-session representation vectors for use by at least one of a machine-learning algorithm or a data analysis algorithm.

9. The system of claim 8, wherein transforming each normalized session dataset into the respective user-session representation vector comprises
reducing, by the processing device, dimensionality of intermediate vectors in the respective set of intermediate vectors.

10. The system of claim 9, wherein reducing dimensionality of the intermediate vectors comprises:

providing the intermediate vectors as inputs to an autoencoder, the autoencoder comprising a plurality of internal states;
configuring the autoencoder to predict the intermediate vectors; and
extracting the reduced-dimension intermediate vectors from an output of one of the plurality of internal states.

11. The system of claim 9, wherein reducing dimensionality of the intermediate vectors comprises:
providing the intermediate vectors as inputs to a Principal Component Analysis algorithm;
performing a linear mapping of the intermediate vectors into a lower-dimension space, wherein the lower-dimension space maximizes variation of the intermediate vectors and has a lower dimension as compared to the intermediate vectors, wherein the reduced-dimension intermediate vectors are outputted by the linear mapping; and
outputting the reduced-dimension intermediate vectors from the lower-dimension space.

12. The system of claim 9, wherein the interaction data further comprises numerical data, and wherein transforming the interaction data into intermediate vectors further comprises assigning enumerated values to data falling within predetermined ranges of numerical values.

13. The system of claim 9, wherein the interaction data further comprises a plurality of interactions, wherein the separating the interactions into sessions further comprises analyzing whether an interaction occurred within a predetermined time interval.

14. The system of claim 9, wherein the at least one of the machine-learning or the data analysis algorithm comprises a topological data analysis algorithm that uses the user-session representation vectors to derive topological invariants for predictive modelling.

15. The system of claim 8, wherein the operations further comprise:
obtaining an output by applying the machine-learning algorithm to the user-session representation vectors; and providing the output to a user device.

16. A non-transitory computer-readable storage medium storing computer-executable program instructions, wherein when executed by a processing device, the program instructions cause the processing device to perform operations comprising:
a step for receiving interaction data comprising a first sequence and a second sequence generated by user devices interacting with an online service via a data network;
a step for separating the interaction data into session datasets, each session of the session datasets comprising a categorical variable;
a step for normalizing the session datasets by removing event identifiers and time stamps;
a step for transforming, by the processing device, each normalized session dataset into a respective user-session representation vector, wherein a distance between a pair of the user-session representation vectors in a Euclidian space corresponds to a dissimilarity between the first sequence and the second sequence with respect to the categorical variable, wherein the transforming comprises:
converting each session data set into a set of intermediate vectors;

providing a respective set of intermediate vectors to an encoder of a Recurrent Neural Network that comprises a plurality of internal encoder states and a decoder;

updating at least one of the plurality of internal encoder states based on the set of intermediate vectors;

providing at least one of the plurality of internal encoder states to the decoder; and extracting a user-session representation vector from the at least one of the plurality of updated internal encoder states; and a step for outputting the user-session representation vectors for use by at least one of a machine-learning algorithm or a data analysis algorithm.

17. The non-transitory computer-readable storage medium of claim 16, wherein the step for transforming each normalized session dataset into the respective user-session representation vector comprises reducing dimensionality of intermediate vectors in the respective set of intermediate vectors.

18. The non-transitory computer-readable storage medium of claim 17, wherein the step for reducing dimensionality of the intermediate vectors comprises:

a step for providing the intermediate vectors as inputs to an autoencoder, the autoencoder comprising a plurality of internal states;

a step for configuring the autoencoder to predict the intermediate vectors; and a step for extracting the reduced-dimension intermediate vectors from an output of one of the plurality of internal states.

19. The non-transitory computer-readable storage medium of claim 17, wherein the step for reducing dimensionality of the intermediate vectors comprises:

a step for providing the intermediate vectors as inputs to a Principal Component Analysis algorithm;

a step for performing a linear mapping of the intermediate vectors into a lower-dimension space, the lower-dimension space maximizes variation of the intermediate vectors and has a lower dimension as compared to the intermediate vectors, wherein the reduced-dimension intermediate vectors are outputted by the linear mapping; and a step for outputting the reduced-dimension intermediate vectors from the lower-dimension space.

20. The non-transitory computer-readable storage medium of claim 17, wherein the data analysis algorithm is a topological data analysis algorithm and wherein the operations further comprise:

obtaining an output by applying the topological data analysis algorithm to the user-session representation vectors; and providing the output to a user device.

* * * * *